May 1, 1951 C. J. MERRIMAN ET AL 2,551,034
RENDERING COOKER
Filed June 21, 1947 3 Sheets-Sheet 1
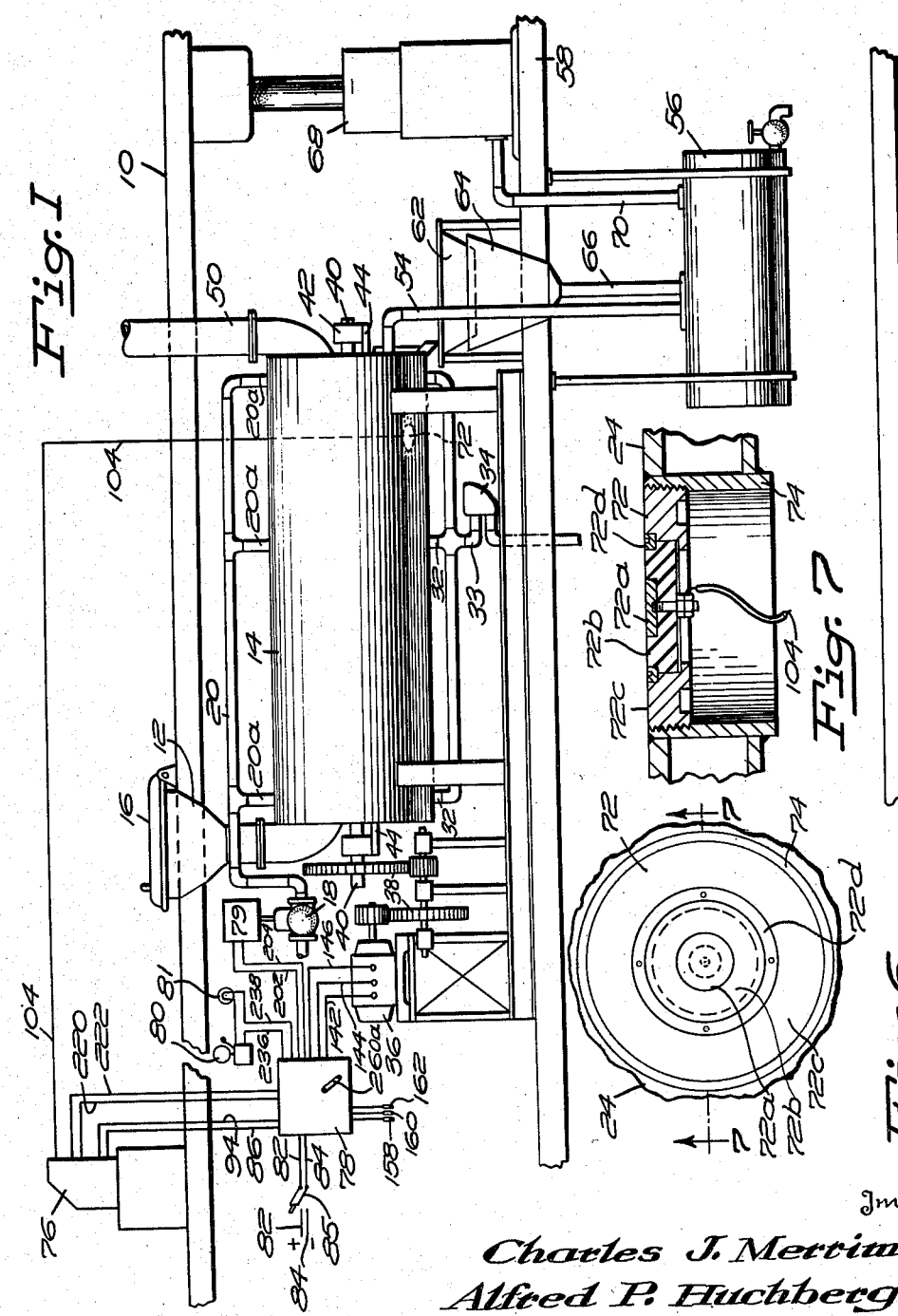
Inventor
Charles J. Merriman
Alfred P. Huchberger
By Harry Dexter Peck
Attorney May 1, 1951     C. J. MERRIMAN ET AL     2,551,034
RENDERING COOKER
Filed June 21, 1947     3 Sheets-Sheet 2
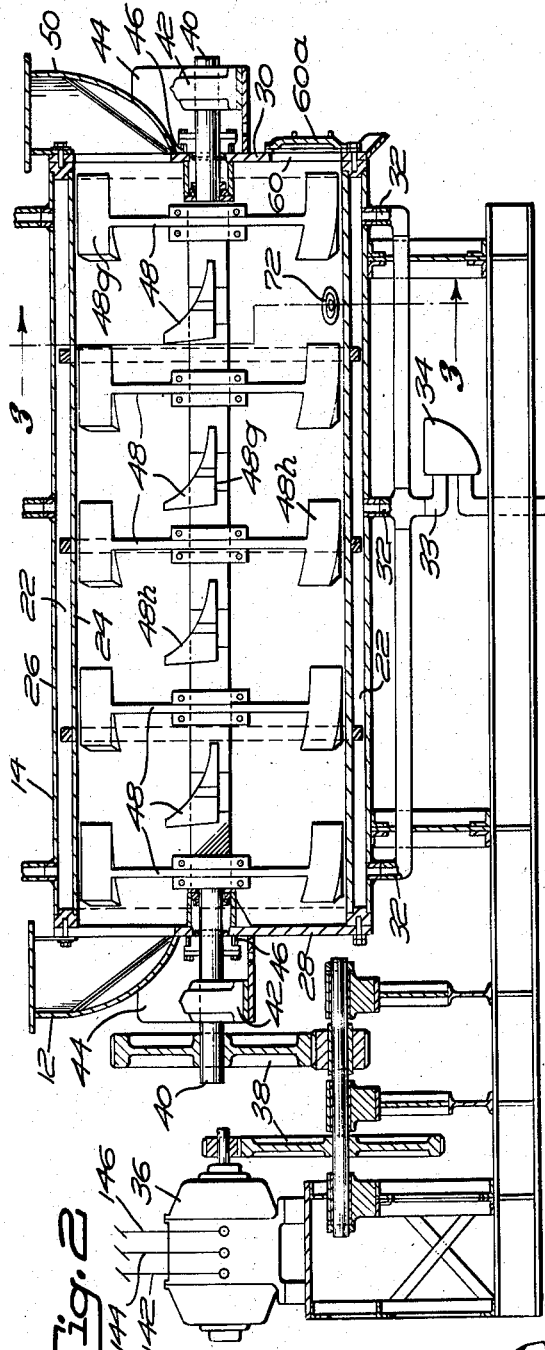
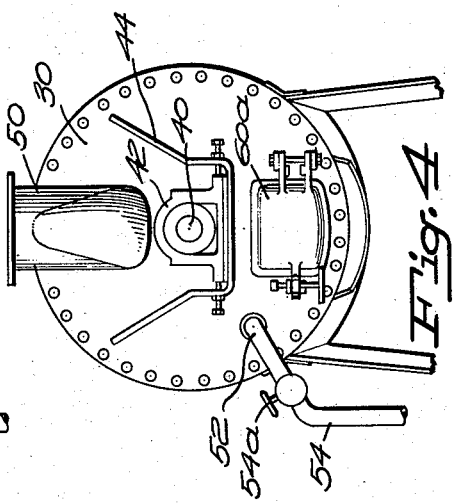
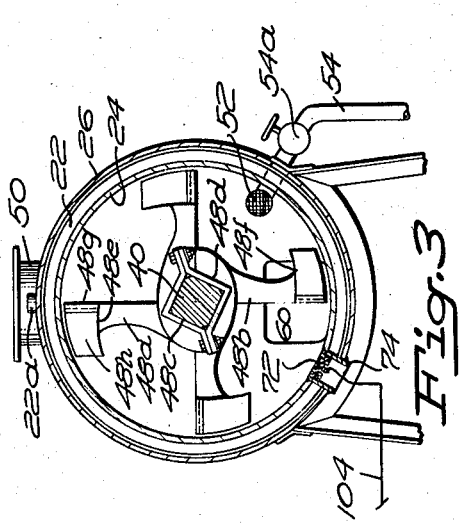
Inventor
Charles J. Merriman
Alfred P. Huchberger
By Harry Dexter Peck
Attorney

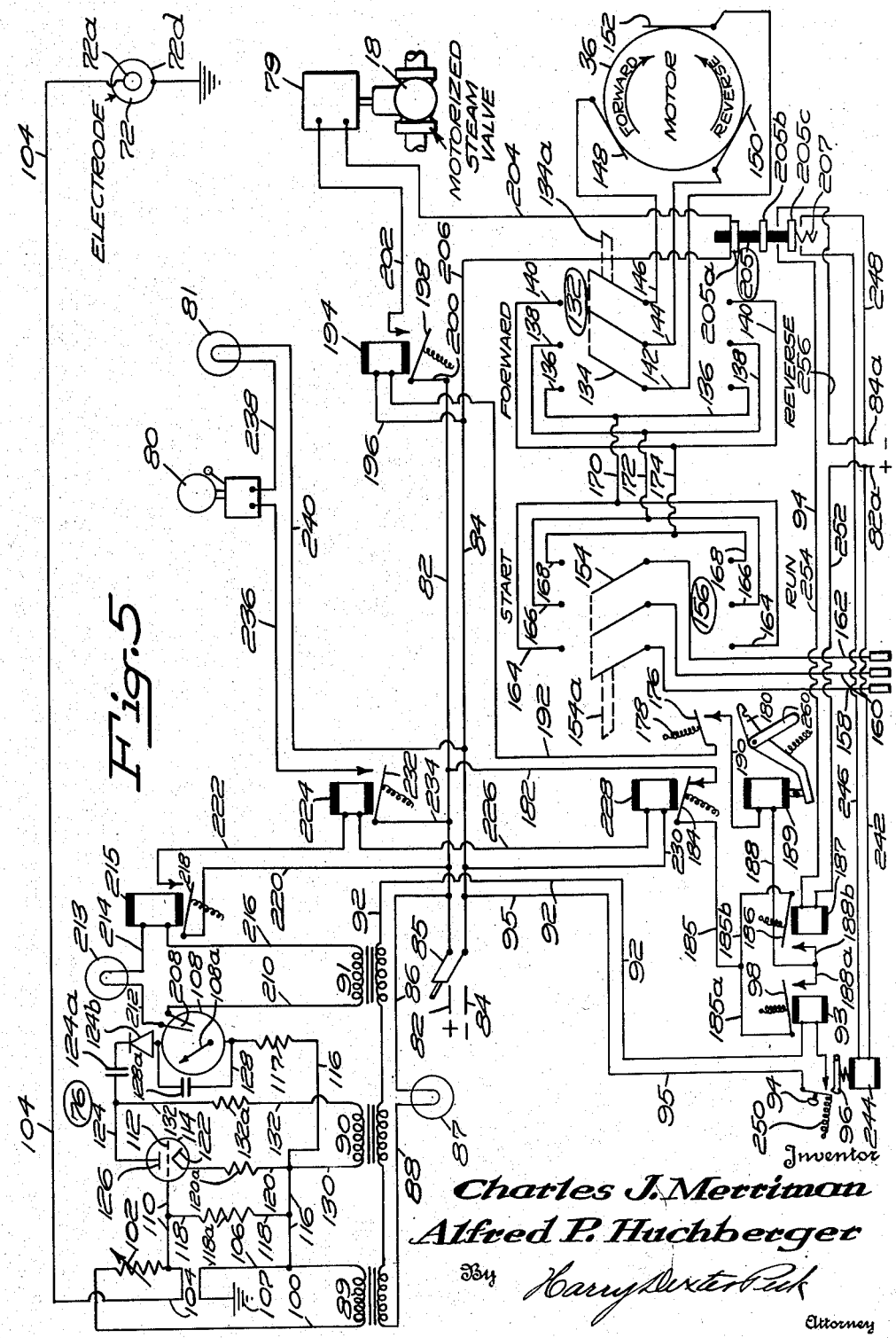

Patented May 1, 1951

2,551,034

UNITED STATES PATENT OFFICE 2,551,034

RENDERING COOKER

Charles J. Merriman, Boston, Mass., and Alfred P. Huchberger, New York, N. Y., assignors to Consolidated Rendering Company, Boston, Mass., a corporation of Maine Application June 21, 1947, Serial No. 756,240

7 Claims. (Cl. 23—280)

This invention relates to improvements in a method and means for processing animal and fish materials. It has to do with the rendering or melting of fat-bearing and oil-bearing edible and inedible animal matter and dehydrating by-products of the livestock slaughtering and fishing industries. More especially the invention provides for the determination of the point at which the processing should cease and for stopping the process when such point is reached. The invention is hereinafter particularly described in its application to the dehydrating and rendering of animal and fish materials.

The rendering industry has been in existence for a great many years using in its process fat-bearing animal materials and extracting the fat therefrom, thus producing tallow and grease and a remainder, high in protein value, which is suitable for animal feeds. By virtually the same process fish waste is dehydrated. When the raw material, either animal or fish, reaches the processing plant it is important that it be promptly processed. This mass of material contains a considerable amount of moisture which must be substantially removed during the cooking operation.

The mass of raw material is promptly placed in a large cylindrical tank variously called a "cooker," a "fat melter" or a "dryer," but hereinafter referred to as a "cooker," and subjected to heat in the neighborhood of 220° F. While under the influence of this heat the mass of material in the cooker must be continuously agitated. If it were permitted to rest undisturbed in the cooker it would soon adhere to the wall thereof and become burned. The layer next adjacent the wall would of course be the first to burn but this damaged condition would gradually proceed through the mass if the heat were continued. By agitating the mass while exposed to the heat it is continuously swept along the surface of the cooker and intermixed with itself until such time as the end of the cooking operation approaches. In the treatment of animal materials this constant stirring of the mass in the cooker enables the fat in liquid form to separate from the remainder. To an extent this liquid fat can be drawn off from the cooker while the dehydrating is taking place.

If the cooking is not carried to the proper point, hereinafter referred to as the "end point," the quantity of fat obtained from the material will be less than it should be, there will remain in the mass an undesired residue of liquid fat and after the mass has been subjected to pressure upon removal from the cooker the final remainder in the solid cake form will still contain excess fat and have a smaller proportion of the protein content which determines its salable value for use in the preparation of animal feeds.

If the cooking is continued beyond the proper end point, such overcooking of the mass causes some of the fat to become "set" or fixed in the solid portions of the mass thus again producing in the final cake form a remainder which is of less value because of the fat retained within it and because of a smaller proportion of proteins. And what is of more importance the fat derived from the mass, especially that which is pressed out after the overcooked mass has been removed from the cooker, is definitely inferior to the quality desired.

Heretofore, the determination of the end point has been dependent entirely upon the judgment of the operator attending to the cooking. As this point has been neared, the operator would take a small sample of the mass from the cooker and feel of it between his fingers. According to its "feel" he would decide whether it should be further cooked or not. Since the decision thus rested solely upon the judgment of the operator, the cooking of the material would vary in accordance with each operator's own personal judgment and even the same operator would not be entirely consistent in his judgment of the several cooking operations performed during his tour of duty.

The cooking or rendering operation varies depending upon the nature of the material being cooked, particularly its moisture content, the amount of heat and the length of time it is applied and, as noted above, the judgment of the man in charge of the cooker. The supply of heat can by modern controls be kept substantially uniform, sufficiently so so that this factor can be considered as no longer a major influence. But the material to be cooked must be taken as delivered to the processing plant and heretofore the judgment as to when the cooking should be ended has been entirely dependent upon the human element.

The principal object of the present invention is to provide an improved method and means whereby the proper end point of the cooking process shall be determined by the changing condition of the material itself, thereby eliminating the judgment of the operator entirely. The improved method involves a continuous testing of the material while in the cooker, this testing being done by presenting to a fixed terminal within the cooker constantly changing samples of the material undergoing the heat treatment. This continuity of testing constantly changing samples is most important because of the non-uniformity of the moisture content in the material being processed which continues almost up to the end point. It is the final desired moisture content in the mass as a whole which indicates that the end point has been reached and the cooking should cease.

The improved means for practicing this method comprises a single fixed terminal particularly positioned in the cooker so that it will be exposed to continually changing samples of the material, an electric circuit comprising said terminal and including an instrument which is responsive to changes in the current flow due to the changing resistance of the material being dehydrated, and control means actuated by the instrument for terminating the cooking operation. Other features of the invention will become apparent as the detailed description hereinafter is developed.

Another objectionable point of the practice heretofore has been the difficulty of supervising the work of the operators in charge of the cookers. In a processing plant the cookers are frequently located in some room remote from the superintendent's office. He has had no way of telling from his office whether or not the cooking process is being carefully watched. The present invention contemplates that the progress of the cooking operation shall be at all times indicated in the superintendent's office, and that the sequence of events leading to the stopping of the cooking operation shall be initiated from that place. The invention also provides for giving signals in the superintendent's office to show that the cooking operation has been terminated, that the discharge of the cooker has been started, and that the system has been reset for the carrying on of the successive cooking operation. Moreover, the invention further provides that simultaneously with the termination of the cooking operation that fact shall be announced to the man in charge of the cooker by an audible or visible signal in his vicinity.

The best mode in which it has been contemplated to apply the principles of the present invention is shown in the accompanying drawings but these are to be taken as illustrative because it is intended that the patent shall cover by suitable expression in the appended claims whatever features of patentable novelty are disclosed in the invention as a whole.

In the accompanying drawings:

Fig. 1 is a somewhat diagrammatic showing of illustrative apparatus embodying the improved structural features of the invention and capable of practicing the improved method;

Fig. 2 is an elevation of a medial section of a cooker, and driving means, used in the dehydrating and rendering operations, showing the improved terminal within the cooker;

Fig. 3 is an elevation in section, taken as on line 3—3 of Fig. 2;

Fig. 4 is an elevation of the head end of the cooker;

Fig. 5 is a diagrammatic layout of the electrical circuits of the improved apparatus;

Fig. 6 is plan view of the novel terminal and coupling; and

Fig. 7 is a sectional view thereof taken as on line 7—7 of Fig. 6.

Referring now to the drawings, and more especially to Fig. 1 which shows somewhat diagrammatically the apparatus associated with the cooking operation, the material to be processed is brought to an upper floor 10 in proximity to an inlet duct 12 which leads downward to one end of a cooker 14. In charging the cooker the material is put into the duct 12 and falls therethrough into the cooker and is then spread along the inner bottom wall thereof as will later be described. When a charge is in the cooker ready for processing, the entrance to the inlet duct is closed by a suitable cover 16 because, as will also appear later, a partial vacuum is set up in the cooker during the cooking operation.

A valve 18 is opened to admit steam to a pipe 20 which has several connections 20a with an annular space 22 (see Fig. 2) between an inner cylindrical shell 24 and an outer cylindrical shell 26 joined at their ends to circular closure plates 28 and 30. Steam at a temperature of 220° F. and upwards is continuously fed to this space 22 while the cooking is in progress. As the heat is transferred to the material in the cooker, the condensate flows out of several outlets 32 at the bottom of the cooker which have connection 33 with a suitable steam trap 34.

With the cooker thus at proper temperature, a constant speed motor 36 is started. This motor is connected by suitable gearing means 38 with a shaft 40 which is journaled in bearings 42 supported by brackets 44 mounted on the end plates 28 and 30. The end portions of this shaft are cylindrical and extend through suitable stuffing boxes 46 at the axis of the cooker. Within the latter the shaft is preferably of rectangular cross section (see Fig. 3) and to it are secured a series of agitators 48.

The preferred form of agitator comprises two arms 48a and 48b, (see Fig. 3), each extending in a generally radial direction from a V-shaped hub member 48c and 48d. These hub members are bolted together and clamp the square shaft 40 tightly between them. The blades 48e and 48f at the ends of the arms are particularly formed. On one side the blade has a flat face 48g which is set at substantially a right angle to the forward path of travel of the blade as it rotates within the cooker. The other side of the blade has a curved surface 48h so disposed that when the blade is moved in the reverse direction this curved surface acts as a sort of plough to move the material in the cooker toward the discharge end thereof. These curved surfaces of the blades are also used to spread a fresh charge of material along the bottom of the cooker when it is received from the inlet duct 12 (see Fig. 2). When turning in the forward direction during the cooking operation, the flat faces 48g (see Fig. 3) of the blades push the material ahead of them forming momentarily behind a blade a sort of trough into which the material falls to be intermixed with itself. This constant agitation of the material causes the mass to move about from side to side and from end to end of the cooker in a general stirring which is not only beneficial but necessary for the successful cooking of the material being processed.

When animal material is being simultaneously dehydrated and rendered the constant application of heat thereto separates part of the fat in liquid form from the more or less solid portions of the mass. During the cooking operation the more volatile liquid or moisture in the mass is converted into a vapor which leaves the cooker through an outlet duct 50 (see Fig. 2) leading to a condenser (not shown). The greatest part of this fluid discharge is water vapor and as it reaches the condenser and is condensed a partial vacuum is set up in the cooker which augments the escape of the vapors. As the fat rendered from the material in the cooker assumes a liquid condition some of it can be drawn off through a screened outlet 52 (see Fig. 3) in the head end 30 (see Fig. 2) of the cooker and conducted through a pipe 54 (see Fig. 3) to a collecting tank 56 (see Fig. 1) below the floor 58 on which the cooker stands.

At a particular point in the processing operation the volatile moisture in the mass will have been substantially all distilled off and at that same point the maximum yield of product both as to quantity and quality will have been attained. At that point the cooking should be brought to an end and the material remaining in the cooker promptly removed therefrom.

This removal is accomplished by turning the motor 36 and agitators 48 (see Fig. 2) in the reverse direction of rotation. As previously described the curved surfaces 48h of the agitator blades are so shaped that while turning in the reverse direction they move the material in the cooker toward and through a discharge opening 60 at the bottom side of the head end of the cooker. The discharged material falls into a hopper 62 (see Fig. 1) having a perforated bottom through which more of the liquid fat drains into a suitable receptacle 64 having a connection 66 with the collecting tank 56. From the hopper 62 the undrained portion of the material is placed in a press 68 and subjected to sufficient pressure to squeeze out the remaining fat which passes through a strainer (not shown) and thence through a pipe 70 to the collecting tank 56. The hard pressed cake of solid matter remaining in the press is then removed and sold for use in the preparation of poultry feed or other animal foods. From the collecting tank 56 the fat is fed into drums, tank trucks or tank cars for transporatation to its place of subsequent use.

As stated earlier the most important step in this dehydrating process, and likewise in the rendering of animal material, is the precise determination of the end point of the cooking operation and the stopping of the cooking when that point is reached. It has been discovered that the determination of the end point can be made by a constant sampling of the material as it is being cooked to find out when substantially all the volatile matter has been removed. It has also been found that the amount of moisture or volatile matter in the material has a direct relation to the resistance of the material to the passage of an electric current through it. Accordingly, the improved method herein disclosed comprises passing a current through continuously changing samples of the material while it is being agitated in the cooker and the volatile matter is being removed. As the volatile matter leaves the mass the resistance of the remaining material increases and when some predetermined point is reached, which in fact is the point at which the major portion of the volatile moisture has been liberated from the material, the cooking operation is abruptly terminated. This prompt cessation of the cooking is accomplished by the improved control apparatus disclosed herein.

One of the principal elements in this apparatus is a single terminal, generally numbered 72, which is used for making contact with the changing samples of the material. The preferred form of terminal is shown in Figs. 6 and 7, and has been found to be most satisfactory. It comprises a central plate 72a of metal having a high coefficient of conductivity. This plate is embedded in a sort of cylindrical plug 72b of nonconducting material with the outer surface of the plate 72a fully exposed. This insulating plug is in turn surrounded by a ring 72c of metal whose outer cylindrical surface is threaded so that the assembly as a whole can be screwed into a suitably threaded hole in the inner end of a tubular coupling 74 (see Fig. 3) which extends from the outer shell of the cooker through the steam space to the inner shell of the cooker. This coupling is welded tightly to both shells and when the terminal is screwed into the coupling, the whole connection is perfectly tight. A ring 72d (see Fig. 7) of metal of high conductivity is also embedded partly in the dielectric 72b and partly in the outer ring 72c, being preferably screwed into the latter. The inner faces of the central plate 72a and the ring 72d are substantially flush with the surface of the inner shell and always available for contact with the material being cooled.

The terminal 72 is placed about one-sixth of the distance from the discharge end 30 (see Fig. 2) to the inlet end 28 of the cooker and about thirty degrees around the circumference of the cooker from its lowermost longitudinal element, and directly under or opposite the path of one of the revolving agitators. As this agitator revolves one of its blades pushes a portion of the material across the terminal and then promptly thereafter the other blade likewise pushes a different portion of the material across the terminal. These successive portions of the material are herein called samples and thus it follows that the terminal is subjected to continually changing samples of the material. Between the approach of one blade and then the other with their different samples, the terminal is, of course, in contact with the material which for the moment is adjacent to it, but it is the recurring contact between the terminal and the moving samples that insures the proper testing of the material.

Because if the material was not being agitated, the layer closest to the wall of the cooker would promptly become completely dehydrated and, indeed would soon become burned. If this layer were in contact with the terminal, its freedom from all volatile moisture would give it a high degree of resistivity, indicating that the cooking process was at an end, whereas under the assumed conditions the greater portion of the material would still be very moist and relatively uncooked. Thus it is highly essential that the material be kept in constant agitation. This, of course, assists in the liberation of the moisture although it is an observed fact that certain portions of the material seem to retain their moisture much longer than do other portions. Indeed, it is not uncommon, even when the end of a cooking operation is near, to have a sample of still quite moist material sweep across the terminal. Such a sample would be relatively low in resistivity and this might mislead an observer as to the general condition of the material as a whole. But such a sample is only one of many being presented to the terminal and thus it is that despite the great change in resistance that momentarily occurs, the continuity of the changing samples enables the control means to be actuated by what might be termed the average condition of the material.

The improved control means comprises an instrument 76 (see Fig. 1) which is preferably located in the office of the plant superintendent and is electrically connected with the terminal 72 and with a control cabinet 78 near the cooker, from which cabinet circuits lead to the motor 36, to a solenoid 79 associated with the steam valve 18, and to alarm devices such as a bell 80 and a lamp 81. The diagrammatic representation of the control system is shown in Fig. 5.

As shown in Fig. 5, the entire control system is inactive, the motor 36 is idle, and the steam valve 18 is closed. The usual domestic supply of current is received via the wires 82 and 84 when the switch 85 is closed as it normally is.

A wire 86 leads from the supply line wire 82 to a signal lamp 87 which is located at the instrument and shows when lighted a distinguishing color, such as white, to an observer in the superintendent's office. From this lamp 87 a wire 88 runs through the primary windings of three induction coils 89, 90 and 91. From the last coil a wire 92 runs to a relay 93 from which a wire extends to a switch 94 whence a wire 95 runs to the other supply line wire 84. This switch 94 will be hereinafter referred to as the "reset switch." It is spring actuated to open position but when closed manually it is engaged by a latch 96 which retains the switch closed until the latch is released as will later appear. When the switch 94 is closed current flows through the lamp 87, the primary windings of the three induction coils 89, 90 and 91, and through the relay 93, energizing the latter and effecting closure of a switch 98 in a circuit presently to be described.

A low voltage current induced in the secondary winding of coil 89 flows along a circuit which comprises a wire 100, an adjustable standardized resistor 102, and a wire 104 leading to the central plate 72a in the cooker. As hereinbefore described the current flow passes from this plate 72a through the material being dehydrated and thence into the ring 72d and through the shell of the cooker to ground. A wire 106 from the coil 89 is also grounded at 107 within the instrument. Thus the circuit between the instrument 76 and the cooker is completed through the ground.

The variation in the amount of current flowing along the wire 104 depends entirely upon the resistance encountered by the current during its passage through the samples of the material in the cooker. If this material is very moist, as it is when first placed in the cooker, the resistance to the flow is relatively very low. As the moisture is volatilized and leaves the mass of material the resistance of the remaining material becomes increasingly greater. Since the voltage remains constant it follows that as the resistance increases the flow of current decreases. This change in current flow is utilized to affect the movement of a pointer 108a in a meter 108 which for purpose of indication is preferably calibrated in terms of the resistance. That is to say, the scale on the meter along which the end of the pointer 108a moves has its graduations marked in terms of resistance rather than in terms of current flow. When the current flow is greatest, which means the resistance in the material is low, or that no material is bridging the annular space between the plate 72a and the ring 72d, the pointer 108a will be at the low end of the scale on the meter. As the current flow diminishes, which means the resistance is increasing, the pointer swings clockwise toward the higher reading end of the scale.

Connected to the wire 104 is a wire 110 leading to the grid 112 of an electronic tube 114. Another wire 116 leads from wire 106 through a resistor 117 to one end of a solenoid (not shown) in the meter 108. A wire 118, including a resistor 118a, is connected across the wires 110 and 116 and from the wire 116 a connection 120 is made through a resistor 120a to the cathode 122 of the tube 114. A connection 124 leads from the plate 126 of the tube through a condenser 124a and thence through a rectifier 124b to the other end of the solenoid in the meter 108. Around the meter is a protective shunt connection 128 including a condenser 128a. The filament circuit through the tube is from the induction coil 90 through wire 130 and thence along the connection 120 to the cathode 122, and from connection 124 through a wire 132 and a resistor 132a to the coil 90. All of which serves to transmit a current flow through the solenoid of meter 108 which corresponds to the flow of current through the samples of material in the cooker.

Let it be assumed that material is in the cooker ready to be processed. The agitators 48 must now be driven in their forward direction of rotation and the steam valve 18 must be opened. With the switch 85 closed, as it usually is, the man in charge of the cooker manually closes the reset switch 94 to establish flow through the primary windings of the coils 89, 90 and 91 of the instrument 76 and also through the lamp 87 which, when lighted, indicates that the instrument is active. The initial lighting of this lamp 87 also indicates in the superintendent's office that the man at the cooker is about to start the cooking operation.

He does this by moving a lever 134 of a reversing switch 132 to the "forward" position and thereby connects the wires 136, 138 and 140 with wires 142, 144 and 146 respectively which lead to the commutator brushes 148, 150 and 152 of the motor 36. The operator then moves a lever 154 of a switch 156 to its "start" position. This connects the power line wires 158, 160 and 162 with wires 164, 166 and 168 respectively which in turn are connected by wires 170, 172 and 174 with the wires 136, 138 and 140. The operator must hold the lever 154 in its "start" position because suitable spring means in the switch assembly 156 always tend to return the lever 154 to its neutral position shown in the drawing. After the motor 36 has thus been started and has reached its normal speed, the operator then throws the lever 154 to its "run" position. In this position, the wires 158, 160 and 162 are also connected through the switch 156 to the wires 164, 166 and 168.

When the lever 154 is moved to its "run" position an arm 154a on the lever engages a switch 176 (which is held in its open position by a tension spring 178), and closes it. The arm 154a is at the same time engaged by a latch 180 which holds the lever 154 in its "run" position. This action of the latch is brought about by the closing of the switch 176 which is part of a circuit comprising a wire 182 leading from the supply line wire 82, a switch 184 that is normally closed, and a wire 185 that has two branches 185a and 185b. The branch 185a leads to the switch 98 associated with the relay 93 and the branch 185b leads to a switch 186 associated with another relay 187 whose functions will later appear. From the switches 98 and 186 two branches 188a and 188b respectively lead through a wire 188 to a relay 189. From the latter a wire 190 goes to the switch 176 and from this switch another wire 192 runs to another relay 194 from which a wire 196 leads to the other supply line wire 84.

Upon the closing of switch 176 by the lever arm 154a (the switches 184 and 98 being already closed), the relay 189 is energized to swing the latch 180 into engagement with the lever arm 154a and hold the lever 154 in its "run" position. Thus the agitators are driven in their "forward" direction of rotation.

The simultaneous energization of relay 194, upon the closing of switch 176, closes another switch 198. This latter switch is part of a circuit comprising a wire 200 leading from the supply line wire 82, a wire 202 running from the switch 198 to the solenoid 79 of the steam valve 18, a wire 204 leading to a normally closed contact arm 205a of the triple switch 205, and a wire 206 running to the other supply line wire 84. This triple switch 205 has two other arms 205b and 205c which are in their open positions when the arm 205a is in its closed position. The switch is held in this described position by a compression spring 207. The closing of switch 198 effects the opening of the steam valve 18 and thus heat is supplied to the material in the cooker.

The apparatus is now effective to carry on the cooking operation. The agitators are turning and continually moving samples of the material in the cooker across the terminal 72 and the steam is supplying heat to the material to affect its dehydration and, if the material is of animal origin, the rendering thereof is taking place. When the liquid fat reaches a level above the screened outlet 52 (see Fig. 3) a valve 54a in the pipe 54 can be opened and the fat drained off into the collecting tank 56 (see Fig. 1). The weight of this liquid fat is sufficient to overcome the partial vacuum in the cooker and so the fat can flow from the cooker until its level is back to that of the screened outlet 52 (see Fig. 3). Whereupon the valve 54a is again closed. As the volatile moisture leaves the material in the cooker, the resistance of the remaining mass increases and, as previously stated, when the dehydration has reached the desired point, the resistance to flow of the current through the material will be at a predetermined point indicated by the position of the pointer 108a (see Fig. 5) of the meter 108.

At this point, the cooking operation is abruptly terminated as follows. The pointer 108a will close a switch 208 in the meter 108. This switch is part of a circuit which comprises a wire 210 leading from the coil 91 to the switch 208, a wire 212 connected to a lamp 213 on the instrument 76, a wire 214 from the lamp to a relay 215, and a wire 216 running to the coil 91. This lamp 213, when lighted, should show a distinguishing color from that of lamp 87. Closing of the switch 208 energizes the relay 215 and brings about the closing of another switch 218. This latter switch is part of a circuit comprising a wire 220 from the supply line wire 82, a wire 222 leading from switch 218 to a relay 224, another wire 226 between the relay 224 and another relay 228 and a wire 230 running to the other supply wire 84. When switch 218 is closed, establishing the circuit just described, both relays 224 and 228 are energized and the lamp 213 is lighted to indicate in the superintendent's office that the cooking operation has ended. At the same time the man at the cooker is likewise informed because the energized relay 224 closes a switch 232 which is part of a circuit comprising a wire 234 connected with the supply line wire 82, a wire 236 running from the switch 232 to a bell 80, a wire 238 from the bell to the lamp 81 and another wire 240 running to the other supply line wire 84. The closing of switch 232 thus brings about the giving of both an audible and a visible signal to the man in charge of the cooker.

This ending of the cooking operation is accomplished, simultaneously with the giving of the signals, because of the energization of the relay 228. When this occurs the switch 184 is opened thus breaking the circuit through the relay 189. The consequent deenergization of this relay releases the latch 180 and allows the lever 154 to return to its neutral position and thus break the power connection to the motor 36 which thereupon stops and the agitators are brought to rest. The opening of the switch 184 also causes the relay 194 to be deenergized, thus permitting the steam valve 18 to close and cut off the supply of steam to the cooker. The latter does not greatly cool down because the steam remaining in the space 22 (see Fig. 2) between the shells of the cooker continues to be condensed and give up heat. This is desirable when the material being processed is animal material because it keeps the fat in the liquid state while the material is being removed from the cooker.

Upon being advised by the signals that the cooking operation has been ended, the operator thereupon opens the door 60a (see Fig. 2) at the discharge outlet and then goes to the control cabinet 78 (see Fig. 1). He first throws the reversing switch lever 134 (see Fig. 5) to its "reverse" position. This will change the connections between the power line wires 136 and 140 so that now they will be connected with the brushes 152 and 148 respectively, thereby preparing the motor circuit for reverse rotation of the motor. In moving the lever 134 to its "reverse" position an arm 134a on the lever engages the triple switch 205 and moves its contact arm 205a to its open position and at the same time moves its other two contact arms 205b and 205c to their closed positions. The movement of the contact arm 205a has no immediate effect, since the switch 198 of the circuit through this contact arm has already been opened as previously described. But the opening of this contact arm 205a does prevent the opening of the steam valve 18 even though the switch 198 is again closed as will presently appear.

The movement of the contact arms 205b and 205c to their closed positions establishes two different circuits. The arm 205c controls a circuit comprising a wire 242 leading from a supply line wire 82 to a relay 244, a wire 246 from this relay to the contact arm 205c, and a wire 248 from the latter arm to another supply line wire 84a. The relay 244 controls the latch 96 and therefore upon the closing of the contact arm 205c and the consequent energization of relay 244, the latch 96 is withdrawn from the reset switch 94 which thereupon moves to its open position under the pull of a spring 250. The opening of the reset switch 94 breaks the circuit through the instrument thus rendering it inactive. This results in both lamps 87 and 213 being extinguished which indicates in the superintendent's office that the cooker operator has initiated the reverse or clearing action of the agitators 48. Moreover, while the switch 132 is set for reverse movement of the agitators, the reset switch cannot be held in closed position by the latch 96 because of the energization of the relay 244. Thus the continuous lighting of the lamp 87 cannot occur while the discharge and loading of the cooker takes place.

The deenergization of the solenoid in the meter 108 allows the switch 208 to open and overcome the tendency of the pointer 108a to keep it closed. With the instrument 76 thus out of control, the relay 215 is deenergized and, as a consequence, relays 224 and 228 are likewise deenergized. The resulting opening of switch 232 cuts off the signal devices 80 and 81. The deenergization of relay 228 permits switch 184 to return to its normally closed position, although this has no immediate effect because as previously described the switch 176 has been opened.

The closing of contact arm 205b, simultaneously with the closing of contact arm 205c, establishes another circuit which comprises a wire 252 running from the supply line wire 82a to the relay 187, a wire 254 thence to the contact arm 205b, and a wire 256 to the other supply line wire 84a. The closing of this circuit by the movement of the contact arm 205b to its closed position energizes the relay 187 and thereby effects the closing of the switch 186. This has no immediate effect because the switch 176 is open, but the closing of the switch 186 does prepare for subsequent current flow along the wire 182 through the closed switch 184, along wire 185 and its branch 185b to the now closed switch 186, thence along the branch 188b and wire 188 to relay 189 and along wire 190 to the switch 176.

The operator now throws the lever 154 to its "start" position and then to its "run" position. As before this starts the motor turning (now in the reverse direction) and as the lever 154 is swung to its "run" position, the switch 176 is again closed by the arm 154a, and the relay 189 is energized to cause latch 180 to engage the lever 154 and hold it in its "run" position. Of course, the closure of switch 176 also re-energizes the relay 194 and closes the switch 198, but this has no effect on the circuit through the steam valve solenoid 78 because the contact arm 205a of the triple switch 205 is still in its open position. Consequently although the motor is running in its reverse direction, there is no steam being supplied to the cooker.

During this reverse movement of the agitators the material remaining in the cooker is pushed toward and out of the opening 60 (see Fig. 2) until the cooker has been cleared. The operator then closes the door 60a and notifies the men on the floor above that the cooker is ready for a new charge and this is put into the cooker through the inlet duct 12. This would pile up at the entrance end of the cooker were it not for the continued rotation of the agitators in the reverse direction. Because of this the new charge is fed along the cooker until it is more or less distributed therein and some of it approaches the opening 60.

When the cooker has thus been charged, the operator goes to the cabinet 78 (see Fig. 1) and by means of a manual handle 260 (see Fig. 5) releases the latch 180. Incidentally this handle 260 has a connection with an external handle 260a (see Fig. 1) by which the motor can be stopped at any time in case of an emergency. This release of the latch 180 (see Fig. 5) and the consequent return of the lever 154 to its neutral position effects the opening of switch 176 and the opening of switch 198 but nothing more immediately follows because the latch 180 was manually released and the circuit through the steam valve solenoid 78 was already broken because of the open contact arm 205a of the triple switch 205.

The operator next throws the lever 134 of the reversing switch 132 back to its "forward" position, and thus removes its arm 134a from engagement with the triple switch 205, allowing its contact arm 205a to return to its closed position and the arms 205b and 205c to return to their open positions. The closure of the contact arm 205a has no effect on the circuit through the steam valve solenoid 78 because the switch 198 is open.

The opening of the contact arm 205b breaks the circuit through the relay 187 and allows switch 186 to open, and the opening of the contact arm 205c deenergizes the relay 244 and permits the latch 96 to return to its position where it can engage and hold the reset switch 94 closed when the latter is manually moved by the operator. In case he should attempt to start the agitators without closing the reset switch 94, he could not do so because the latch 180 would not engage the arm 154a of the lever 154 and the latter would return to its neutral position. This is due to the fact that both switches 98 and 186 are open and the relay 189 is not energized. Therefore, before the next cooking operation can be started the operator must manually close the reset switch 94. As previously described this is held closed by the latch 96 and the resulting current flow through relay 93 closes the switch 98 so that the relay 189 will be energized to hold the lever in its said position upon the closing of switch 176 by movement of the lever 154 to its "run" position.

The closing of the reset switch 94 by the cooker operator restores the instrument 76 to activity and this is indicated in the superintendent's office by the lighting of lamp 87. The lamp 213 will not be relighted, however, because the fresh material put into the cooker and moved along toward its discharge end has placed some of the material in contact with the terminal 72. This material is so moist and its resistance to flow of the current through it is so low that upon the reenergization of the instrument the flow of current along wire 104 is great enough to return the pointer promptly to the lower end of its scale and at a position remote from the switch 208.

This completes the cycles of operation and the operator can at once proceed to throw the switch 154 to its "start" position to initiate another cooking operation.

Although the performance of the cooker and the control devices have been described more particularly for both the dehydrating and rendering of animal material, the operation is substantially the same when the material being processed is fish material. Ordinarily no rendering occurs when fish material is in the cooker and so there is no opening of the valve 54a (see Fig. 3). In some instances, however, with certain kinds of fish material oil can be extracted, in which case the whole operation proceeds just the same as when animal material is being both dehydrated and rendered.

We claim:

1. The combination with a cooker for rendering material, having a fixed inner cylindrical shell, a rotatable shaft centrally disposed within said shell with agitator blades mounted thereon so as to wipe around close by the bottom wall of said shell, a motor having driving connection with said shaft, a power circuit to said motor, a manually operated switch in said circuit which tends to assume an open position, a latch for holding said motor switch closed, of control means comprising an auxiliary circuit having a normally open switch therein in position to be closed by the manual closing of the motor circuit switch and having a normally closed switch, a solenoid in said auxiliary circuit responsive upon the closing of the normally open switch in said auxiliary circuit to actuate said latch to hold said motor switch closed, a second auxiliary circuit having a solenoid capable upon being energized to effect opening of said normally closed switch and thereby deenergizing the first mentioned solenoid to release said latch, and a third auxiliary circuit for effecting the energization of the second mentioned solenoid, the said third auxiliary circuit comprising a connection with said inner shell and another connection with an insulated terminal mounted in said inner shell in such spaced relation thereto that the space between them is spanned by continually changing samples of the material being rendered whereby the moisture in said samples acts as a conductor between said terminal and said shell, the amount of current flow in said third circuit being in accordance with the moisture content of said current conducting samples, and a device in said third circuit responsive when the current flow through the said samples corresponds to a predetermined moisture content therein to effect the energization of said second circuit and thereby bring about the deenergization of the first said auxiliary circuit and the opening of said motor switch.

2. The combination with a cooker for rendering material to a desired end point, having inner and outer cylindrical shells with an annular space therebetween, a rotatable shaft centrally positioned within said shells having agitator blades mounted thereon so as to wipe portions of the material along the bottom wall of the inner shell, a flow connection between said space and a supply of steam, a valve in said connection, a motor attached to said shaft, and a power circuit for said motor, of control apparatus for controlling the operation of said motor and said valve comprising a main switch in said power circuit, an auxiliary circuit having switching means therein closed by the closing of said main switch, relay means in said auxiliary circuit energized upon the closing of said switching means to hold said main switch closed and the said valve open; a second auxiliary circuit normally open and having a relay therein capable upon being energized to effect the opening of the first said auxiliary circuit and thereby deenergizing its said relay means; and a third auxiliary circuit comprising a connection with the inner shell of said cooker and a connection with an immovable terminal mounted in said inner shell, insulated therefrom, and so positioned with respect to said shell that continually changing samples of the material being rendered make contact simultaneously with the shell and said immovable terminal whereby the moisture content of said material conducts the current flow between said terminal and said shell, the amount of such current flow being dependent upon the moisture content of said current conducting samples, and a relay in said third circuit acting upon the current flow therein corresponding to a predetermined end point condition of said material to effect closure of the said second circuit and thereby energize the relay in said second circuit and bring about the opening of the first said circuit with consequent de-energization of its said relay means whereby the motor is stopped and the steam valve is closed.

3. The combination with a cooker containing a charge of material to be rendered, having fixed inner and outer cylindrical shells with an annular space therebetween, a rotatable shaft centrally disposed within said shells with agitator blades mounted thereon so as to wipe around the inner shell close by its bottom wall, an electric motor for driving said shaft, a power circuit connected to said motor, a main switch in said power circuit, a fluid flow connection between said annular space and a supply of steam, and a valve in said fluid flow connection for controlling the flow of steam therethrough, of control means responsive to a predetermined condition of said material for stopping said motor and closing said steam valve when said predetermined condition of the material being rendered is reached; said control means comprising releasable means for holding said main switch closed during the rendering operation of the cooker, a solenoid effective when energized for holding said steam valve open, a control circuit including switching means held closed during the rendering operation for retaining the said releasable means in motor operating position and for maintaining said solenoid energized, and another control circuit including said inner shell and an immovable terminal insulated from said shell in position for continually changing samples of the material being rendered to be in contact with the said terminal and said shell simultaneously whereby current is conducted between the terminal and said shell by the moisture content of said samples, the current flow thus conducted being proportional to the moisture content of said material samples, and means in the last said control circuit responsive to the current flow therein corresponding to the said predetermined condition of the material for effecting the opening of the said switching means in the first said control circuit to thereby effect the opening of said main switch and the de-energization of said solenoid whereby the said motor is stopped and the steam valve is closed.

4. The combination with a cooker containing a charge of material to be rendered, having fixed inner and outer cylindrical shells with an annular space therebetween, a rotatable shaft centrally disposed within said shells with agitator blades mounted thereon so as to wipe around the inner shell close by its bottom wall, an electric motor for driving said shaft, a power circuit connected to said motor, a main switch in said power circuit, a fluid flow connection between said annular space and a supply of steam, and a valve in said fluid flow connection for controlling the flow of steam therethrough, of control means responsive to a predetermined condition of said material for stopping said motor, closing said steam valve and giving a signal when said predetermined condition of the material being rendered is reached; said control means comprising releasable means for holding said main switch closed during the rendering operation of the cooker, a solenoid effective when energized for holding said steam valve open, signal means, a control circuit including switching means held closed during the rendering operation for retaining the said releasable means in motor operating position and for maintaining said solenoid energized, a second control circuit including said signal means and switching means held open during said rendering operation, and a third control circuit including an immovable terminal mounted in said inner shell in insulated spaced relation thereto, the said terminal being so positioned that the space between it and the shell is spanned by continuously changing samples of said material being moved along by the said agitator blades, whereby the said samples conduct current between the terminal and said shell in accordance with the moisture content of the samples, and means in the said third circuit responsive to the current flow therein corresponding to a predetermined moisture content of the material for effecting the opening of the said switching means in the first said circuit to thereby effect the opening of said main switch and the deenergization of said solenoid whereby the said motor is stopped and the steam valve is closed, and for effecting the closing of the said switching means in the said second circuit to close said second circuit and actuate said signal means.

5. The combination with a cooker containing a charge of material to be rendered, having fixed inner and outer cylindrical shells with an annular space therebetween, a rotatable shaft centrally disposed within said shells with agitator blades mounted thereon so as to wipe around the inner shell close by its bottom wall, an electric motor for driving said shaft, a power circuit connected to said motor, a main switch in said power circuit, a fluid flow connection between said annular space and a supply of steam, and a valve in said fluid flow connection for controlling the flow of steam therethrough, of control means responsive to a predetermined condition of said material for stopping said motor and closing said steam valve when said predetermined condition of the material being rendered is reached; said control means comprising an auxiliary circuit which is closed upon the said main switch being closed in its run position; means in said auxiliary circuit for holding said motor switch closed in its run position and for holding said steam valve open; a second auxiliary circuit normally open during the rendering operation and capable upon being closed to effect the opening of the first said auxiliary circuit; and a third auxiliary circuit including said inner shell and an immovable terminal fixed in the bottom wall thereof and insulated therefrom in such spaced relation thereto that the space between said terminal and said inner shell is bridged by continuously changing samples of the said material as they are wiped across said terminal by the said agitator blades whereby the moisture of the said samples conducts the current flow in said third circuit between said terminal and said shell, the said current flow being in direct relation to said moisture content of said samples, and means in said third auxiliary circuit responsive to the current flow reaching a predetermined amount corresponding to the end point of the rendering process to effect closure of the said second auxiliary circuit and thereby bring about the opening of the first said circuit whereby the said main switch is opened and the steam valve is closed.

6. The combination with a cooker containing a charge of material to be rendered and having fixed inner and outer cylindrical shells with an annular space therebetween, piping connecting said annular space with a supply of steam and having a valve therein, a rotatable shaft centrally disposed within said shells with agitator blades thereon so as to wipe around the inner shell close by its bottom wall and a motor for driving said shaft, of control apparatus for controlling the operation of said valve and said motor comprising a control circuit for said motor with switching means therein which when closed effects actuation of said motor, a solenoid connected with said valve and capable when energized of holding said valve open, a second control circuit for energizing said solenoid and thereby holding said steam valve open and having energized relay means therein effective on the switching means of the first said control circuit for holding the first said circuit closed thereby keeping the motor in operation, and a third circuit including connections with the inner shell and with an immovable terminal fixed in the wall of said inner shell and insulated therefrom in spaced relation thereto so that continuously changing samples of the material being rendered bridge the space between the terminal and said shell whereby the moisture content of said samples conducts the current flow in said third circuit, the amount of said current flow being directly proportional to the moisture content of said samples, and a relay in said third circuit which responds when said current flow corresponds to a predetermined condition of the material to effect opening of the switching means in the first said control circuit and the deenergization of said solenoid thereby to stop said motor and close said valve.

7. The combination with a cooker containing a charge of material to be rendered and having fixed inner and outer cylindrical shells with an annular space therebetween, piping connecting said annular space with a supply of steam and having a valve therein, a rotatable shaft centrally disposed within said shells with agitator blades thereon so as to wipe around the inner shell close by its bottom wall and a motor for driving said shaft, of control means for controlling the action of said valve and said motor comprising a control circuit for said motor with switching means therein which when closed effects actuation of said motor, a solenoid connected with said valve and capable when energized of holding said valve open, a second control circuit which is energized when said switching means of the first said circuit is closed to effect energization of said solenoid, means controlled by said second control circuit for holding the said switching means of the first said control circuit closed, a switch in said second circuit held closed while said motor is in operation, a third circuit including relay means capable when energized of opening said switch in said second circuit and thereby deenergizing said second circuit, and a fourth circuit having connection with the inner shell and with an insulated terminal fixed in and in spaced relation to the bottom of said inner shell so as to be contacted by the continually charging samples of said material wiped across it by the said agitator blades, the said spaced relation being such that the said samples make simultaneous contact with the inner shell and the terminal whereby the moisture content of the samples acts as a conductor for current flow between the inner shell and the terminal, the said current flow being proportional to said moisture content in said samples, and means in said fourth circuit responsive to the current flow therein and actuated when the said current flow corresponds to a predetermined condition of the said material to effect energization of said third circuit whereby the relay means in said third circuit operates to open the said closed switch of the said second circuit, thereby deenergizing the said second circuit and effecting the closing of said steam valve and the stopping of said motor.

CHARLES J. MERRIMAN.
ALFRED P. HUCHBERGER.

REFERENCES CITED

The following references are of record in the file of this patent:

UNITED STATES PATENTS

| Number | Name | Date |
|---|---|---|
| 1,121,598 | Powling | Dec. 15, 1914 |
| 1,630,124 | Laabs | May 24, 1927 |
| 1,695,254 | McTavish | Dec. 11, 1928 |
| 1,930,169 | Halvorson et al. | Oct. 10, 1933 |
| 1,930,831 | Webb | Oct. 17, 1933 |
| 2,016,920 | Fisher et al. | Oct. 8, 1935 |
| 2,045,381 | Elberty, Jr. | June 23, 1936 |
| 2,231,457 | Stephen | Feb. 11, 1941 |
| 2,387,293 | Preston | Oct. 23, 1945 |